(12) United States Patent
Mayrhofer

(10) Patent No.: US 8,096,170 B2
(45) Date of Patent: Jan. 17, 2012

(54) APPARATUS FOR MEASURING THE CYLINDER INTERNAL PRESSURE OF INTERNAL COMBUSTION ENGINES

(75) Inventor: Norbert Mayrhofer, Graz (AT)

(73) Assignee: AVL List GmbH, Graz (AT)

( * ) Notice: Subject to any disclaimer, the term of this patent is extended or adjusted under 35 U.S.C. 154(b) by 606 days.

(21) Appl. No.: 12/086,775

(22) PCT Filed: Dec. 21, 2006

(86) PCT No.: PCT/AT2006/000534
§ 371 (c)(1),
(2), (4) Date: Feb. 18, 2009

(87) PCT Pub. No.: WO2007/070908
PCT Pub. Date: Jun. 28, 2007

(65) Prior Publication Data
US 2010/0147057 A1    Jun. 17, 2010

(30) Foreign Application Priority Data
Dec. 22, 2005 (AT) ............................ A 2059/2005

(51) Int. Cl.
*G01M 15/08* (2006.01)

(52) U.S. Cl. .................... 73/114.16; 73/114.18

(58) Field of Classification Search ........... 73/114.16, 73/114.18
See application file for complete search history.

(56) References Cited

U.S. PATENT DOCUMENTS

| 3,463,010 A | 8/1969 | Hatschek |
| 3,983,748 A * | 10/1976 | Isaev ......................... 73/114.18 |
| 4,457,180 A | 7/1984 | List et al. |
| 5,753,798 A | 5/1998 | Engeler et al. |
| 6,359,377 B1 | 3/2002 | Durling |
| 6,561,036 B1 * | 5/2003 | Gustafsson et al. ............ 73/714 |
| 7,533,562 B2 * | 5/2009 | Lifvenborg ................ 73/114.16 |

FOREIGN PATENT DOCUMENTS

| AT | 235046 | 8/1964 |
| DE | 2939324 | 4/1981 |
| EP | 0811832 | 12/1997 |

OTHER PUBLICATIONS

English Abstract of EP 0811832.

* cited by examiner

*Primary Examiner* — Freddie Kirkland, III
(74) *Attorney, Agent, or Firm* — Dykema Gossett PLLC

(57) ABSTRACT

The invention relates to an apparatus for measuring the cylinder internal pressure of internal combustion engines and, in particular, of gas engines, said apparatus having a first valve (5) which opens into the cylinder interior space, a measurement chamber (6) which can be connected to the cylinder interior space (1*a*) and can be disconnected from the latter by means of the first valve (5), and a pressure sensor (8) which is arranged in the region of the measurement chamber (6) in order to measure the pressure in the cylinder interior space when the first valve (5) is open. Permanent operation without thermal overload is enabled in such a way that at least one second valve (13) is provided in the region of the measurement chamber (6), said second valve being able to be changed to a closed position at least when the first valve (5) is open in order to seal off the measurement chamber (6) towards the outside.

16 Claims, 2 Drawing Sheets

APPARATUS FOR MEASURING THE CYLINDER INTERNAL PRESSURE OF INTERNAL COMBUSTION ENGINES

BACKGROUND OF THE INVENTION

1. Field of the Invention

The invention relates to an apparatus for measuring the cylinder internal pressure of internal combustion engines and, in particular, of gas engines in this case, said apparatus having a first valve which opens into the cylinder interior space, having a measurement chamber which can be connected to the cylinder interior space and can be disconnected from the latter by means of the first valve, and having a pressure sensor which is arranged in the region of the measurement chamber in order to measure the pressure in the cylinder interior space when the first valve is open, with at least one second valve being provided in the region of the measurement chamber, said second valve being able to be changed to a closed position at least when the first valve is open in order to seal off the measurement chamber towards the outside.

2. The Prior Art

There is an increasing need in the construction of internal combustion engines to measure the cylinder internal pressure during operation. Such a measurement is performed by means of so-called indexing valves which comprise a pressure sensor in a measurement chamber which can be brought into connection with the cylinder internal space via a valve. There is a possibility of precise determination of knocking by means of such pressures sensors. It is also possible however to analyze the progression of combustion and to check cylinder balancing. Such indexing valves are known for example from EP 0 811 833 A or DE 29 39 324 A.

Especially in the case of gas engines there are special conditions which make it difficult to provide optimal configuration for such indexing valves. Gas engines are frequently used for electric power generation and are therefore in permanent operation, so that the exchange of the pressure sensor can only be performed in conventional indexing valves only after a longer running period in the course of routine maintenance. Until such an exchange is performed, the internal combustion engine must be operated without the functionality of pressure measurement. There is an additional problem in connection with gas engines that in contrast to internal combustion engines with auto-ignition (as is the case with diesel engines), the arrangement of an indexing valve remote from the combustion chamber is usually not possible because a thermal overload of the indexing valve and the indexing port would occur.

The present invention can also be applied to internal combustion engines which are not piston engines, e.g. to gas turbines. In this case, the terms "cylinder internal space", "cylinder internal pressure", etc. shall be understood mutatis mutandis as "combustion chamber", "combustion chamber internal pressure", etc.

Various indexing valves are further known from EP 0 811 832 A, DE 12 64 103 B and AT 235.046 B which comprise a pressure sensor and several valves. These indexing valves have a complex configuration and are thus difficult to produce and susceptible to malfunctions. As a result of the relatively long paths into the interior of the indexing valves, pressure peaks can be detected only imprecisely and there is an increased susceptibility to coking.

It is the object of the present invention to avoid such disadvantages and to provide a solution which has a simple configuration, is sturdy and enables a reliable measurement of the cylinder internal pressure. In particular, the indexing valve in accordance with the invention shall also enable continuous measurements over prolonged periods of time and enable an exchange of the pressure sensor during operation of the internal combustion engine.

SUMMARY OF THE INVENTION

These objects are achieved in accordance with the invention in such a way that the first valve has a movable valve body in which the pressure sensor is arranged. In this configuration, the pressure sensor is usually arranged coaxially in the valve body, so that very little space is required in the cylinder head for the indexing valve. It is possible through a configuration with two valves to realize a very compact design and to keep thermal stress on the components very low.

The removal of the pressure sensor during operation of the internal combustion engine is facilitated especially in such a way that the pressure sensor is fastened to a sensor holder which is held in a removable fashion in the movable valve body of the first valve.

In a first preferred embodiment of the present invention, the first valve is arranged as an inwardly opening poppet valve which has a seat surface which is averted from the cylinder internal space and cooperates with a first valve seat. The special advantage of this embodiment is that when the first valve is closed the cylinder internal pressure will contribute to keeping the valve in the closed position. In this connection it is especially advantageous when the second valve is arranged as a poppet valve and has a seat surface which faces the measurement chamber and cooperates with a second valve seat.

An alternative embodiment provides that the first valve is arranged as a poppet valve which opens to the outside and which comprises a seat surface facing the cylinder internal space and cooperating with the first valve seat.

As an alternative to this, the valve can open inwardly, which also allows using the valve in the closed state as a pressure guard. Moreover, it is possible in this case to realize a smaller outside diameter.

A continuous pressure measurement over prolonged periods of time can be achieved in an especially preferred manner in such a way that the seat surface of the first valve and the seat surface of the second valve are thermally coupled at least in the opened position of the first valve. In the opened position of the first valve, the heat flow introduced into the valve body is removed through the seat surface of the second valve. The thermal coupling consists primarily in a spatial closeness of the seat surfaces of the first and second valve. It can also be influenced however by the choice of material, such that materials with high thermal conductivity are provided for the valve body. It is especially preferable in a thermal respect when the seat surface of the first valve and the seat surface of the second valve are arranged on a common valve body. In addition to the thermal advantages, a mechanically very simple arrangement is achieved.

An especially simple solution in a constructional respect can be realized in such a way that the measurement chamber is in connection with a circumferential surface of the valve body of the first valve via at least one port. The measurement chamber is usually arranged in a centric manner in the valve body and can be provided with a respectively compact configuration.

Reasonable closing and holding forces can be achieved in such a way that a valve body of the first valve is pre-tensioned via a spring to the closed position of the first valve.

The maintenance friendliness of the apparatus in accordance with the invention is especially increased in such a way that a sleeve to be screwed into the cylinder head is provided on which a valve seat for the first valve and a valve seat for the second valve are arranged. A frequently occurring problem of indexing valves is that the function of the pressure sensor is impaired by soiling, coking and the like. In order to increase service lives in this case and extend maintenance intervals it is provided in an especially preferred embodiment of the apparatus in accordance with the invention that the first valve and the second valve can be brought to a scavenging position in which both valves are at least partly opened in order to open the measurement chamber both towards the cylinder internal space as well as to the outside. In the scavenging position, a relatively high quantity of gas is blown through the measurement chamber to the outside, through which the gas sensor can be cleaned. In the case of a respective constructional arrangement, a certain scavenging effect can be achieved in the course of switching the first valve from the opened to the closed position and vice-versa. An especially effective scavenging is achieved however when the scavenging position is held for a short predetermined period of time.

A further embodiment of the apparatus in accordance with the invention provides that a valve body of the first valve and a valve body of the second valve are arranged to be mechanically separated from each other. It is preferable that the actuation of the first valve is performed in a coupled manner with the actuation of the second valve. The actuation of the valves can thus be performed independent from each other.

BRIEF DESCRIPTION OF THE DRAWINGS

The invention is now explained in closer detail by reference to the embodiments shown in the drawings, wherein.

DETAILED DESCRIPTION OF THE PREFERRED EMBODIMENTS

Figure 1:
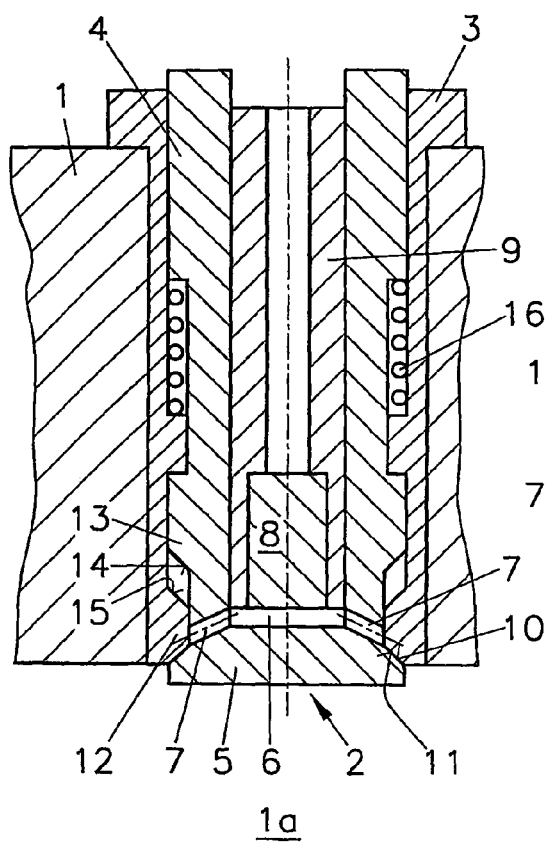
FIG. 1 and FIG. 2 schematically show a sectional view of two different embodiments of the apparatus in accordance with the invention.

An indexing valve which is generally designated with reference numeral 2 is provided in the cylinder head 1 of an internal combustion engine. The indexing valve 2 consists of a sleeve 3 which is screwed into the cylinder head 1. The indexing valve 2 opens at its bottom side into the combustion chamber 1a of a cylinder (not shown in closer detail).

A valve body 4 is movably held in the axial direction in the sleeve 3, which valve body comprises a valve disk 5 at its end facing the combustion chamber 1a which also simultaneously represents the first valve. A measurement chamber 6 is provided above the valve disk 5, which measurement chamber is in connection via ports 7 in the valve body 4 with its outside. A pressure sensor 8 is arranged in the measurement chamber 6 which is held via a sensor holder 9 in the valve body 4.

In the embodiment of FIG. 1, the first valve 5 opens towards the combustion chamber 1a, such that the seat surface 10 of the first valve 5 lifts off from a valve seat 11 which in sleeve 3 is oriented towards the combustion chamber 1a. The seat surface 10 is accordingly oriented away from the combustion chamber 1a. The valve seat 11 of the first valve 5 is arranged on the sleeve 3 on the bottom side of a projection 12 which is provided in the manner of a circumferential ring and on whose upper side a further valve seat 15 is provided which cooperates with a seat surface 14 of a second valve 13. When the first valve 5 is completely opened, the seat surface 14 of the second valve 13 rests on the valve seat 15 of sleeve 3. Due to the spatial closeness of valve disk 5 to the seat surface 14, the heat introduced during the operation of the internal combustion engine into the valve disk 5 can be passed on efficiently to the sleeve 3 and thus to the cylinder head 1.

The valve body 4 is upwardly pretensioned by a spring, i.e. to the closed position of valve 5.

Figure 2:
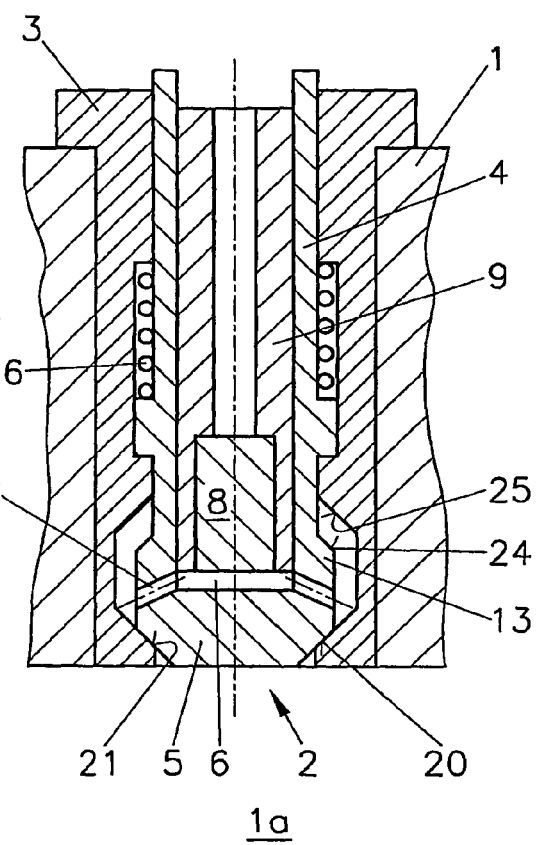

The embodiment of FIG. 2 differs from FIG. 1 in such a way that the seat surface 20 of the first valve 5 is oriented towards the combustion chamber 1a of the internal combustion engine. Accordingly, the valve seat 21 in sleeve 3 is oriented away from the combustion chamber 1a. The second valve 13 comprises a seat surface 24 which cooperates with a valve seat 25 in sleeve 3. In contrast to the embodiment of FIG. 1, spring 16 of the embodiment according to FIG. 2 pretensions the valve body 4 downwardly, so that in agreement with the embodiment of FIG. 1 the first valve 5 is pretensioned to the closed position.

The common aspect in both embodiments is that a middle position can be set in which both the first valve 5 as well as the second valve 13 are situated in a partly opened state. It is thus possible to scavenge the measurement chamber 6 and thus the pressure sensor 8 by the gases flowing from the combustion chamber 1a.

Figures 3, 4:
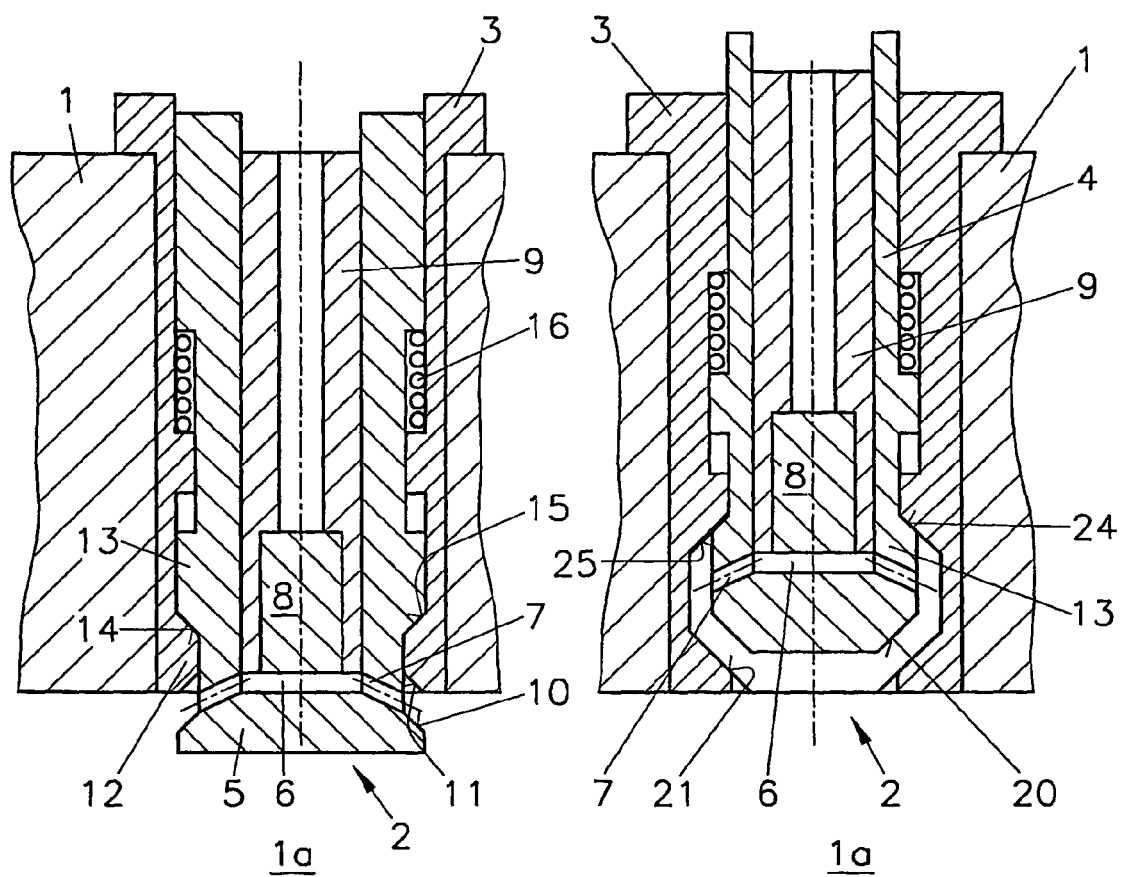
FIG. 3 and FIG. 4 show the embodiments of FIG. 1 and FIG. 2 in different operational states.

FIG. 3 shows the embodiment of FIG. 1 with opened first valve 5. FIG. 4 shows the embodiment of FIG. 2 with opened first valve 5.

The present invention allows performing the measurement of the cylinder internal pressure of gas engines and similar combustion engines in a sturdy and permanent way.

The invention claimed is:

1. An apparatus for measuring the cylinder internal pressure of internal combustion engines and, in particular, of gas engines, said apparatus having a first valve (5) which opens into the cylinder interior space, a measurement chamber (6) which can be connected to the cylinder interior space and can be disconnected from the latter by means of the first valve (5), and a pressure sensor (8) which is arranged in the region of the measurement chamber (6) in order to measure the pressure in the cylinder interior space (1a) when the first valve (5) is open, with at least one second valve (13) being provided in the region of the measurement chamber (6), said second valve being able to be changed to a closed position at least when the first valve (5) is open in order to seal off the measurement chamber (6) towards the outside, wherein the first valve (5) comprises a movable valve body (4) in which the pressure sensor (8) is arranged.

2. The apparatus according to claim 1, wherein the pressure sensor (8) is fastened to a sensor holder (9) which is held in a removable fashion in the movable valve body (4) of the first valve (5).

3. The apparatus according to claim 1, wherein the first valve (5) is arranged as an inwardly opening poppet valve which has a seat surface (10) which is averted from the cylinder internal space (1a) and cooperates with a first valve seat (11).

4. The apparatus according to claim 3, wherein the second valve (13) is arranged as a poppet valve and has a seat surface (14) which faces the measurement chamber (6) and cooperates with a second valve seat (15).

5. The apparatus according to claim 1, wherein the first valve (5) is arranged as a poppet valve which opens to the outside and which comprises a seat surface (20) facing the cylinder internal space (1a) and cooperating with the first valve seat (21).

6. The apparatus according to claim 5, wherein the second valve (13) is arranged as a poppet valve and comprises a seat surface (24) which is averted from the measurement chamber (6) and cooperates with a second valve seat (25).

7. The apparatus according to claim 6, wherein the seat surface (10, 20) of the first valve (5) and the seat surface (14, 24) of the second valve (13) are thermally coupled at least in the opened position of the first valve (5).

8. The apparatus according to claim 7, wherein the seat surface (10, 20) of the first valve (5) and the seat surface (14, 24) of the second valve (13) are arranged on a common valve body (4).

9. The apparatus according to claim 1, wherein the measurement chamber (6) is in connection with a circumferential surface of the valve body (4) of the first valve (5) via at least one port.

10. The apparatus according to claim 1, including a valve body (4) of the first valve (5) is pre-tensioned via a spring (16) to the closed position of the first valve (5).

11. The apparatus according to claim 10, including a sleeve (3) to be screwed into the cylinder head (1) on which a valve seat (11, 21) for the first valve (5) and a valve seat (15, 25) for the second valve (13) are arranged.

12. The apparatus according to claim 1, wherein the first valve (5) and the second valve (13) can be brought to a scavenging position in which both valves (5, 13) are at least partly opened in order to open the measurement chamber (6) both towards the cylinder internal space as well as to the outside.

13. The apparatus according to claim 1, including a valve body (4) of the first valve (5) and a valve body (4) of the second valve (13) are arranged to be mechanically separated from each other.

14. The apparatus according to claim 13, wherein the actuation of the first valve (5) is performed in a coupled manner with the actuation of the second valve (13).

15. The apparatus according to claim 1, wherein the actuation of the first and/or second valve (5, 13) occurs electromagnetically.

16. An apparatus for measuring internal pressure of a cylinder in an engine, said apparatus comprising:
   a sleeve which is positionable in a bore of a cylinder head which communicates with the cylinder, said sleeve defining first and second annular seat surfaces,
   a valve body which is movably positioned with said sleeve so as to move toward and away from the cylinder, said valve body providing a valve disk at an end thereof facing the cylinder and a measurement chamber behind the valve disk, said valve body defining third and fourth annular seat surfaces, and
   a pressure sensor mounted within said valve body and movable therewith, said pressure sensor communicating with said measurement chamber,
   movement of said valve body relative to said sleeve causing said first and third seat surfaces to contact, which opens said measuring chamber to the cylinder, or said second and fourth seating surfaces to contact, which closes said measuring chamber from the cylinder.

* * * * *